(12) United States Patent
Nakajima

(10) Patent No.: US 10,555,260 B2
(45) Date of Patent: Feb. 4, 2020

(54) COMMUNICATION APPARATUS, CONTROL METHOD FOR COMMUNICATION APPARATUS, AND STORAGE MEDIUM

(71) Applicant: CANON KABUSHIKI KAISHA, Tokyo (JP)

(72) Inventor: Takafumi Nakajima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 122 days.

(21) Appl. No.: 15/016,109

(22) Filed: Feb. 4, 2016

(65) Prior Publication Data
US 2016/0232393 A1  Aug. 11, 2016

(30) Foreign Application Priority Data
Feb. 9, 2015  (JP) .................................. 2015-023712

(51) Int. Cl.
G06K 19/00 (2006.01)
H04W 52/02 (2009.01)
H04W 84/12 (2009.01)

(52) U.S. Cl.
CPC ........ *H04W 52/0229* (2013.01); *H04W 84/12* (2013.01)

(58) Field of Classification Search
USPC ................................. 235/435, 439, 454, 462
See application file for complete search history.

(56) References Cited

U.S. PATENT DOCUMENTS

| | | | | |
|---|---|---|---|---|
| 2010/0012715 A1* | 1/2010 | Williams | ............... | G06Q 20/32 235/375 |
| 2011/0302051 A1* | 12/2011 | Arbatli | ................. | G06Q 10/087 705/26.8 |
| 2014/0269646 A1* | 9/2014 | Ramasamy | ......... | H04W 76/023 370/338 |

FOREIGN PATENT DOCUMENTS

| | | | |
|---|---|---|---|
| JP | 2008172642 A | | 7/2008 |
| JP | 2010056955 A | | 3/2010 |
| JP | 2010-178054 A | | 8/2010 |
| JP | 2013-17237 A | | 1/2013 |
| JP | 2013143616 A | | 7/2013 |
| JP | 2014-60623 A | | 4/2014 |
| JP | 2014-60627 A | | 4/2014 |
| JP | 2014183470 A | | 9/2014 |
| JP | 2015-515048 A | | 5/2015 |

* cited by examiner

*Primary Examiner* — Matthew Mikels
(74) *Attorney, Agent, or Firm* — Canon USA, Inc., IP Division

(57) ABSTRACT

In a case where a communication apparatus is not connected to another communication apparatus operable as a providing apparatus for providing a wireless parameter for performing wireless communication to a receiving apparatus, when information is acquired from a captured image, the communication apparatus connects to the another communication apparatus, and notifies the another communication apparatus of apparatus information included in the information acquired from the image, as information about an apparatus operating as the receiving apparatus. The notification enables the another communication apparatus to provide the wireless parameter to an apparatus indicated by the apparatus information.

9 Claims, 7 Drawing Sheets

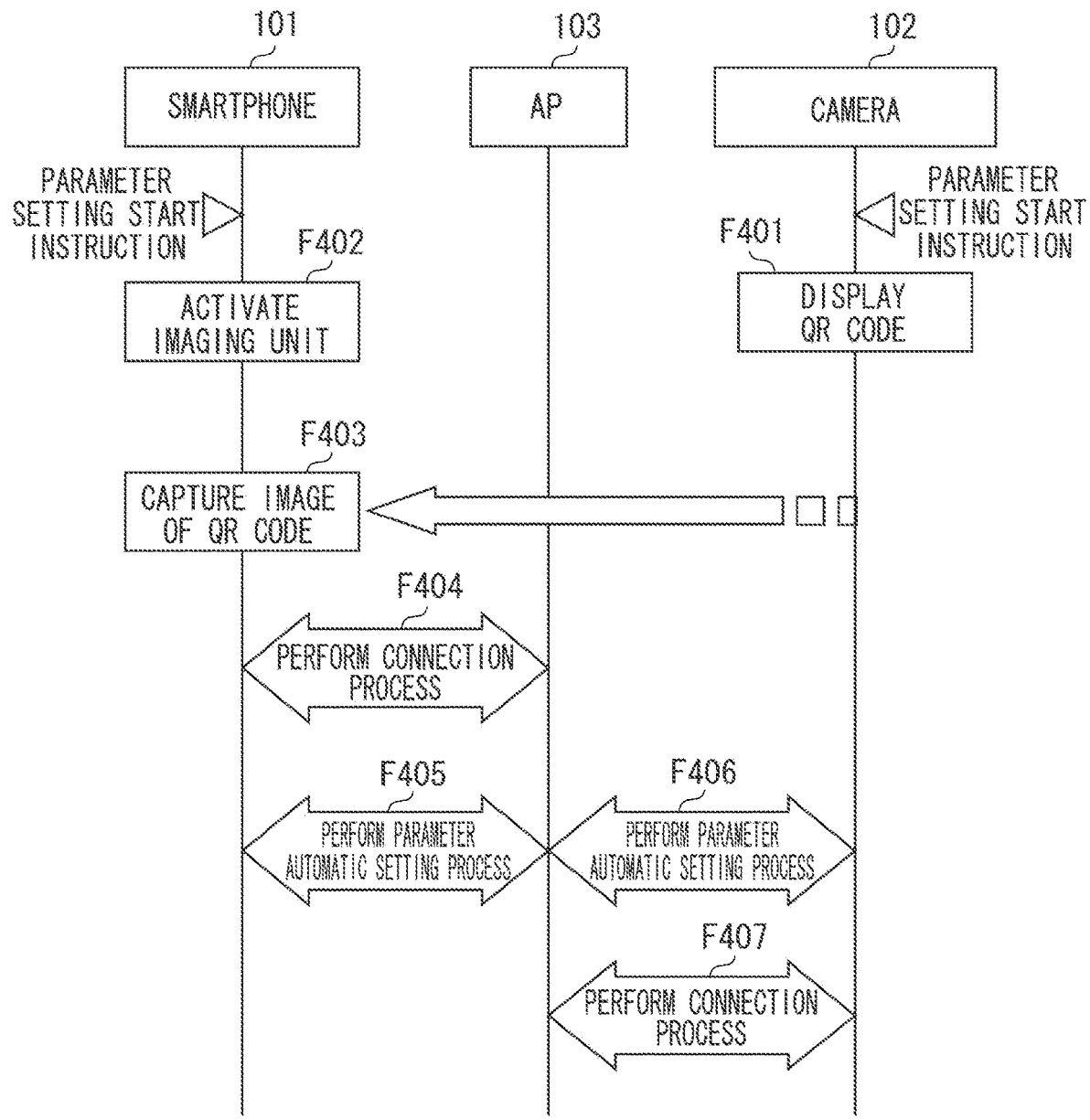

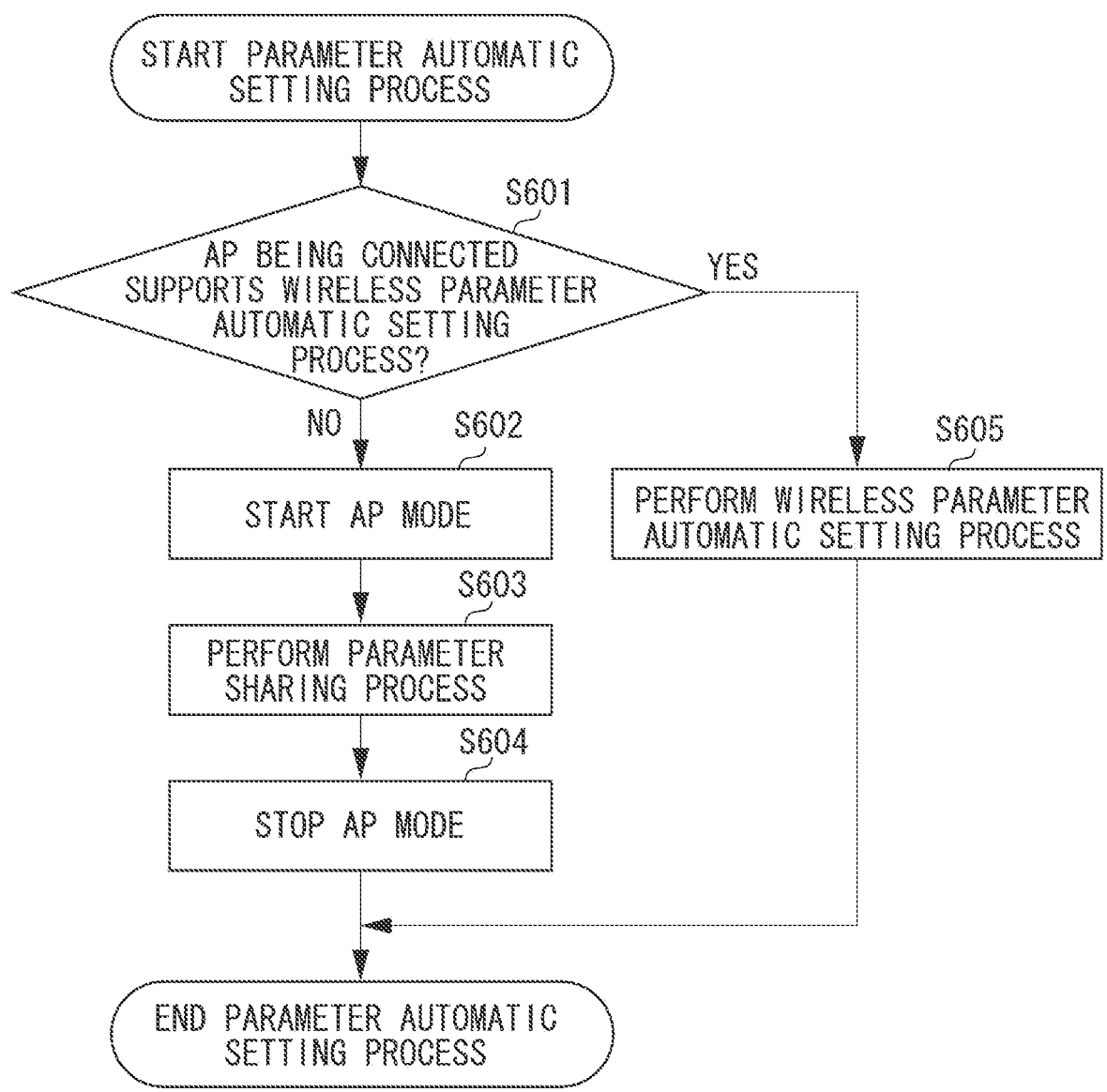

COMMUNICATION APPARATUS, CONTROL METHOD FOR COMMUNICATION APPARATUS, AND STORAGE MEDIUM

BACKGROUND

Field

Aspects of the present invention generally relate to communication technology.

Description of the Related Art

In recent years, there has been an increasing number of cases where an electronic device such as a digital camera, a printer, a mobile phone, and a smartphone has a wireless communication function, and the electronic device is used by being connected to a wireless network.

It is necessary to set various communication parameters such as an encryption method, an encryption key, an authentication method, and an authentication key, for connecting the electronic device to the wireless network. There is a technology for facilitating the setting of these communication parameters (Japanese Patent Application Laid-Open No. 2014-60623). In this technology, a mobile terminal reads a Quick Response code (QR code) (registered trademark, hereinafter omitted) indicating a communication parameter, which is displayed by an electronic device, and the communication parameter obtained through the reading set at an access point.

In Japanese Patent Application Laid-Open No 2014-60623, the electronic device can also be connected to the access point to which the mobile terminal is connected. Nevertheless, the technology in Japanese Patent Application Laid-Open No. 2014-60623 is intended for connecting the electronic device to the access point to which the mobile terminal is being connected when reading the QR code, and no consideration is given to case where the mobile terminal is not being connected to the access point when reading the QR code. Therefore, conventionally, for setting a wireless parameter in an electronic device upon image capturing of code information such as a two-dimensional code, in which a large amount of information can be encoded, a mobile terminal needs to be connected to a network to which the electronic device is to be connected, during the image capturing. In this way, the conventional technology requires work for connecting the mobile terminal during image capturing. Thus, there is room for improvement in terms of convenience.

SUMMARY

According to an aspect of the present invention, communication apparatus includes a registration unit configured to register another communication apparatus operable as a providing apparatus for providing a wireless parameter for performing wireless communication to a receiving apparatus, a connection unit configured to, in a case where the communication apparatus is not connected to the another communication apparatus registered by the registration unit, connect the communication apparatus to the another communication apparatus registered by the registration unit, when information is acquired from a captured image, and an execution unit configured to execute a process for notifying, using connection established by the connection unit, the another communication apparatus registered by the registration unit of apparatus information included in the information acquired from the image, as information about an apparatus operating as the receiving apparatus, wherein the process executed by The execution unit enables the another communication apparatus registered by the registration unit to provide the wireless parameter to an apparatus indicated by the apparatus information.

Further features of aspects of the present invention will become apparent from the following description of exemplary embodiments with reference to the attached drawings.

BRIEF DESCRIPTION OF THE DRAWINGS

FIG. 4 is a diagram illustrating an operation sequence of the communication system.

FIG. 6 is a flowchart illustrating an operation of a smartphone.

DESCRIPTION OF THE EMBODIMENTS

Exemplary embodiments to be described below are directed to notifying another apparatus operable as providing apparatus, of information necessary for setting a wireless parameter, even if an own apparatus is not being connected to the other apparatus when an image including the information is captured.

Figure 1:
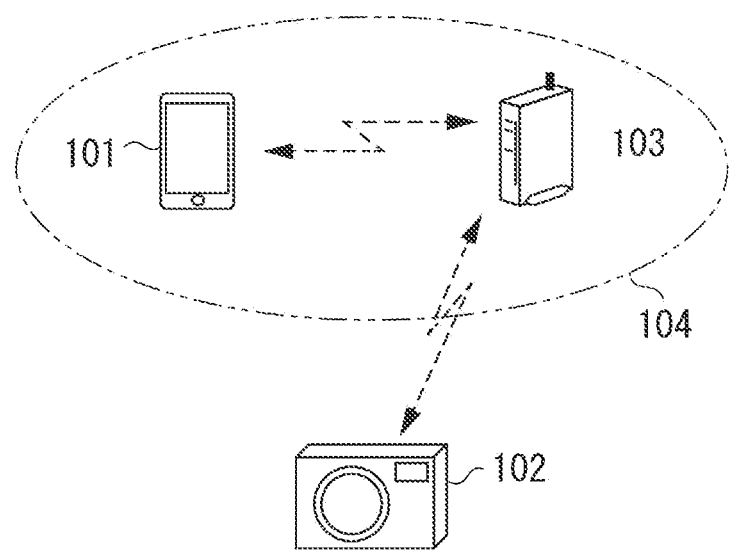
FIG. 1 is a diagram illustrating an example of a configuration of a communication system.

FIG. 1 illustrates a configuration of a communication system according to a first exemplary embodiment. In FIG. 1, the communication system includes a smartphone 101 and a camera 102. The communication system further includes an access point 103 and a wireless network 104 constructed by the access point 103. In the present exemplary embodiment, the wireless network 104 illustrated in FIG. 1 is a wireless local area network (LAN) compliant with the Institute of Electrical and Electronics Engineers, Inc. (IEEE) 802.11 series. However, the communication configuration is not necessarily limited to the wireless LAN compliant with the IEEE 802.11.

In the present exemplary embodiment, the access point 103 (hereinafter referred to as "AP 103") operates as an access point in an infrastructure mode defined in the IEEE 802.11 standard. The AP 103 forms the wireless network 104, and performs authentication and encryption processing for a station (STA), management of the STA, and the like. Further, the smartphone 101 and the camera 102 each operate as a station (STA) in the infrastructure mode defined in the IEEE 802.11 standard.

Hereinafter, the description will be given of a case where the smartphone 101 and the camera 102 connect to the wireless network 104 formed by the AP 103 to perform communication. Apparatuses in the communication system of the present exemplary embodiment are described as a smartphone and a camera, but may be any other apparatuses such as a printer, a personal computer (PC), a video camera, a smartwatch, and a personal digital assistant (PDA), for example.

Figure 2:
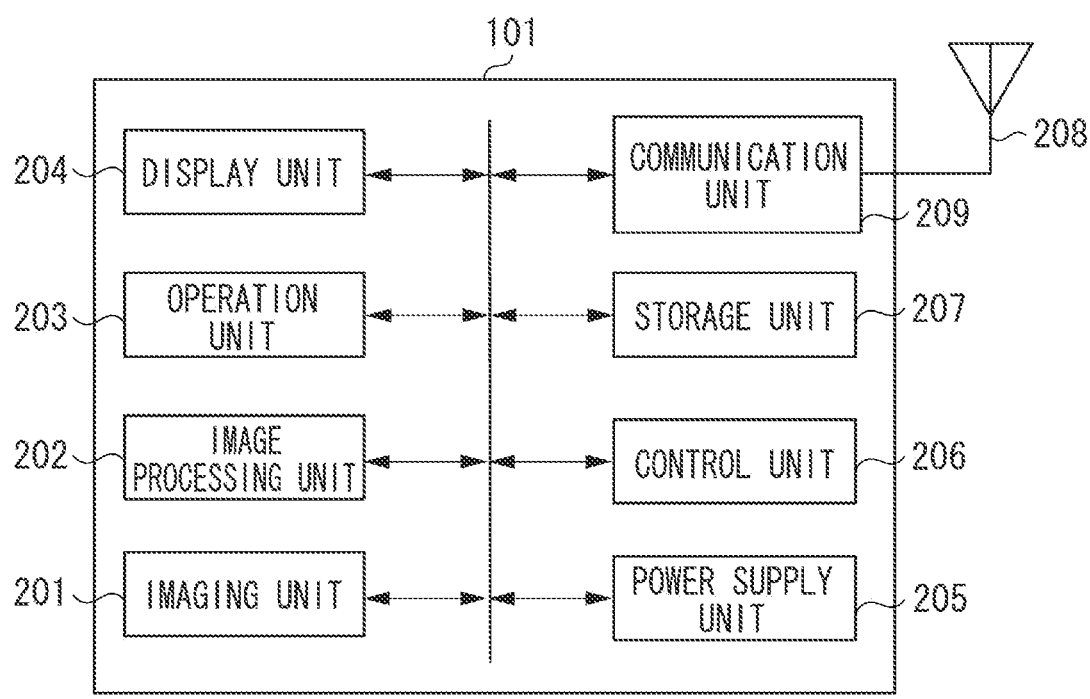
FIG. 2 is a diagram illustrating a configuration of a smartphone.

A hardware configuration of the apparatus according to the present exemplary embodiment will be described using FIG. 2. FIG. 2 illustrates the entire smartphone 101. An imaging unit 201 includes a charge coupled device (CCD) sensor, a lens, and the like. The imaging unit 201 captures a still image and a moving image. The imaging unit 201 captures an image of code information such as a bar code and a two-dimensional code represented by a Quick Response (QR) code, and reads such code information. An image processing unit 202 performs image processing on images such as an image captured by the imaging unit 201. The image processing unit 202 performs decoding processing and analysis processing of code information such as a QR code, which will be described below. The image processing unit 202 analyzes an image captured by the imaging unit 201 and decodes encoded information to obtain the information.

An operation unit 203 is provided for operating the smartphone 101, and includes members such as operation buttons. The operation unit 203 stores a flag corresponding to an input, into a memory such as a storage unit 207. A display unit 204 has a function of outputting at least either one of visual information and sound information. When displaying the visual information, the display unit 204 has a video random access memory (VRAM) for holding image data corresponding to the visual information to be displayed. The display unit 204 performs display control to keep displaying the image data stored in the VRAM, on a liquid crystal display (LCD) or a light emitting diode (LED) display. A power supply unit 205 supplies power to each piece of hardware of the smartphone 101. The power supply unit 205 includes a battery, for example.

A control unit 206 controls the entire smartphone 101 by executing a control program stored in the storage unit 207. Various operations to be described below are performed by the control unit 206 executing control programs stored in the storage unit 207. The control unit 206 includes a central processing unit (CPU), for example. The storage unit 207 stores the control programs to be executed by the control unit 206, and various kinds of information including information about a communication partner apparatus. The storage unit 207 includes a storage medium such as a hard disk drive (HDD), a flash memory, a detachable/attachable secure digital (SD) card, a read only memory (ROM), and a random access memory (RAM), for example.

An antenna 208 is provided for performing wireless LAN communication, and enables communication in a 2.4 GHz band and/or a 5 GHz band. A communication unit 209 is provided for performing wireless LAN communication compliant with the IEEE 802.11 series. The communication unit 209 includes a chip for performing wireless communication.

The description will be given of a function to be implemented by the control unit 206 executing a program stored in the storage unit 207 of the smartphone 101. Specifically, the function to be described below is implemented by the control unit 206 controlling each piece of hardware and performing calculation and processing of information, according to the control program.

The smartphone 101 performs a wireless parameter automatic setting process for sharing a wireless parameter between apparatuses. In the wireless parameter automatic setting process, a providing apparatus provides a communication parameter for performing wireless communication, to a receiving apparatus. Here, the wireless parameter includes a wireless communication parameter necessary for performing wireless LAN communication, such as a service set identifier (SSID) serving as a network identifier, an encryption method, an encryption key, an authentication method, and an authentication key. The wireless parameter may also include a media access control (MAC) address, a passphrase, an Internet protocol (IP) address for performing communication in an IP layer, information necessary for an upper level service, and the like.

The smartphone 101 can execute the wireless parameter automatic setting process using one or more methods. A first method executable by the smartphone 101 is a method of sharing a wireless parameter between two apparatuses, i.e., the smartphone 101 and another apparatus.

In the first method, the smartphone 101 captures an image of a QR code displayed by the other apparatus or associated with the other apparatus. The smartphone 101 then acquires information necessary for performing wireless parameter setting that is included in the read QR code. The information necessary for performing wireless parameter setting includes, for example, a wireless parameter itself, identification information of an apparatus, and identification information of a wireless parameter automatic setting process.

The smartphone 101 then acquires the identification information of the apparatus that is included in the read QR code. The identification information of the apparatus may be a MAC address or a universal unique identifier (UUID) for uniquely identifying the apparatus. The smartphone 101 receives an encrypted wireless parameter from the apparatus indicated by the identification information acquired from the QR code. Based on the received wireless parameter, the smartphone 101 wirelessly connects to the apparatus indicated by the identification information acquired from the QR code. A communication parameter encrypted using a public key may be communicated between the apparatuses in the wireless parameter automatic setting process. Encryption of the communication parameter using the public key may be performed using, for example, a method discussed in Japanese Patent Application Laid-Open No. 2013-17237. This public key may be included as code information.

A second method executable by the smartphone 101 is a method of sharing a wireless parameter among two or more other apparatuses via the smartphone 101. In the second method, the smartphone 101 performs processing for wirelessly connecting between a first apparatus and a second apparatus. Here, the first apparatus an apparatus that newly joins a wireless network. The first apparatus operates as a receiving apparatus that receives a wireless parameter in a wireless parameter automatic setting process. The second apparatus is an apparatus operable as a providing apparatus that provides the wireless parameter in the wireless parameter automatic setting process. The second apparatus may be an access point that constructs the wireless network.

In the second method, the smartphone 101 captures an image of a QR code displayed by the first apparatus or associated with the first apparatus. The QR code associated with the first apparatus is, for example, a QR code attached to the casing of the first apparatus or a QR code described in an instruction manual of the first apparatus.

The smartphone 101 acquires identification information of the first apparatus that is included in the read QR code. The smartphone 101 transfers, via a secure link, the identification information of the first apparatus that is included in the read QR code, to the second apparatus that is an apparatus made connectable through the setting using the first method beforehand, and capable of establishing the secure Upon receiving the identification information of the first apparatus that is included in the QR code and transferred from the smartphone 101, the second apparatus transmits the wireless parameter to the first apparatus. Based on the received wireless parameter, the first apparatus wirelessly connects to the second apparatus. Inc second apparatus may transmit the wireless parameter encrypted by a public key cryptosystem, to the first apparatus. The smartphone 101 may notify the second apparatus of the identification information using a secure link based on a wireless LAN, or using secure near field wireless communication such as Near Field Communication (NFC). Further, this transfer may be performed using communication other than the wireless LAN communication, such as Bluetooth (registered trademark). Furthermore, the smartphone 101 may perform this transfer by causing the display unit 204 to display a QR code based on the information read from the acquired QR code, thereby allowing the second apparatus to read the displayed QR code.

According to the second method, the second apparatus operable as the providing apparatus is notified of the identification information of the first apparatus operating as the receiving apparatus, which is included in the information read from the QR code. Therefore, the wireless parameter can be shared between the first apparatus and the second apparatus.

When performing the setting using the second method, the smartphone can register the second apparatus beforehand. An apparatus to be registered as the second apparatus may be an apparatus with which a wireless parameter has ever been shared using the first method. Further, the apparatus to be registered as the second apparatus may be an apparatus connectable via a secure link.

In the communication performed by the communication unit 209, the smartphone 101 can operate as an access point defined in the IEEE 802.11. In the communication performed by the communication unit 209, the smartphone 101 can also operate as a station defined in the IEEE 802.11. The smartphone 101 can also execute wireless communication compliant with Wi-Fi Direct (registered trademark) defined by the Wi-Fi Alliance, and can operate as a group owner and a client. The smartphone 101 can also execute Wi-Fi Protected Setup (WPS) defined by the Wi-Fi Alliance, in the communication performed by the communication unit 209.

Figure 3:
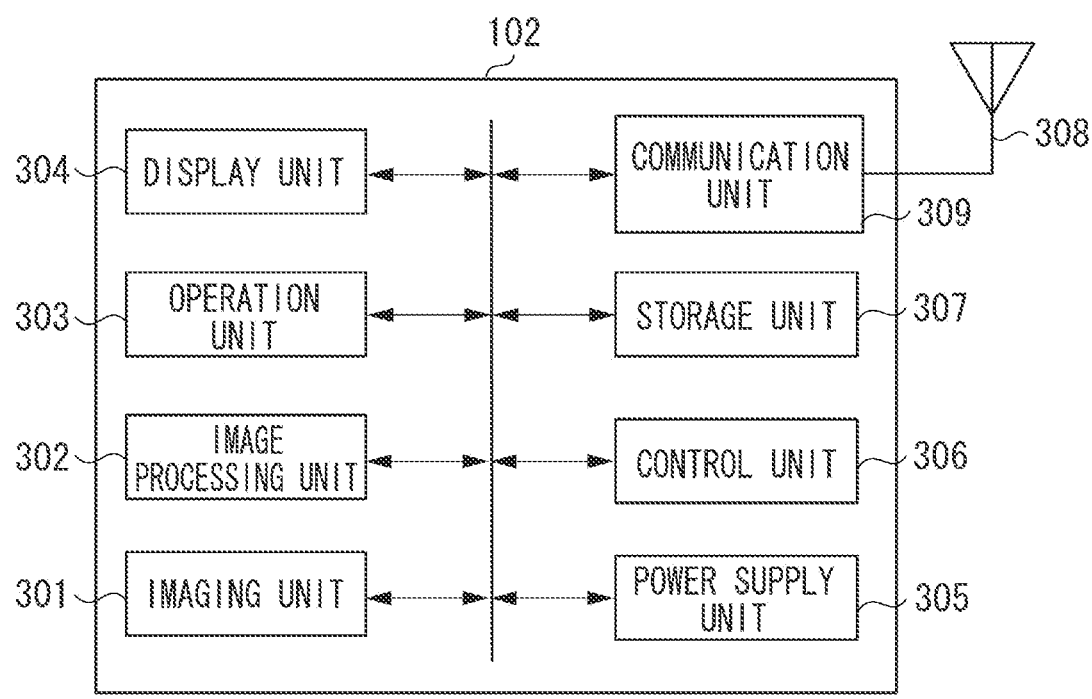
FIG. 3 is a diagram illustrating a configuration of a camera.

Next, a configuration of the camera 102 will be described using FIG. 3. FIG. 3 illustrates the entire camera 102. An imaging unit 301 includes a COD sensor, a lens, and the like. The imaging unit 301 captures a still image and a moving image. The imaging unit 301 captures an image of code information such as a bar code and a two-dimensional code represented by a QR code, and reads such code information. An image processing unit 302 performs image processing on images such as an image captured by the imaging unit 301. The image processing unit 302 performs decoding processing and analysis processing of code information such as a QR code, which will be described below. The image processing unit 302 analyzes an image captured by the imaging unit 301 and decodes encoded information to obtain the information.

An operation unit 303 is provided for operating the camera 102, and includes members such as operation buttons. The operation unit 303 stores a flag corresponding to an input, into a memory such as a storage unit 307. A display unit 304 has a function of outputting at least either one of visual information and sound information. When displaying the visual information, the display unit 304 has a VRAM for holding image data corresponding to the visual information to be displayed. The display unit 304 performs display control to keep displaying the image data stored in the VRAM, on an LCD or an LED display. A power supply unit 305 supplies power to each piece of hardware of the camera 102. The power supply unit 305 includes a battery, for example.

A control unit 306 controls the entire camera 102 by executing a control program stored in the storage unit 307. Various operations to be described below are performed by the control unit 306 executing control programs stored in the storage unit 307. The control unit 306 includes a CPU, for example. The storage unit 307 stores the control programs to be executed by the control unit 306, and various kinds of information including information about a communication partner apparatus. The storage unit 307 includes a storage medium such as an HDD, a flash memory, a detachable/attachable SD card, a ROM, and a RAM, for example.

An antenna 308 is provided for performing wireless LAN communication, and enables communication in a 2.4 GHz band and/or a 5 GHz band. A communication unit 309 is provided for performing wireless LAN communication compliant with the IEEE 802.11 series. The communication unit 309 includes a chip for performing wireless communication.

Next, the description will be given of a function to be implemented by the control unit 306 executing a program stored in the storage unit 307 of the camera 102. Specifically, the function to be described below is implemented by the control unit 306 controlling each piece of hardware and performing calculation and processing of information, according to the control program.

The camera 102 performs a wireless parameter automatic setting process for sharing a wireless parameter between apparatuses. In the communication performed by the communication unit 309, the camera 102 can operate as an access point defined in the IEEE 802.11. In the communication performed by the communication unit 309, the camera 102 can also operate as a station defined in the IEEE 802.11. The camera 102 can also execute wireless communication compliant with Wi-Fi Direct (registered trademark) defined by the Wi-Fi Alliance, and can operate as a group owner and a client. The camera 102 can also execute WPS defined by the Wi-Fi Alliance, in the communication performed by the communication unit 309.

Further, the camera 102 generates a QR code including information necessary for performing wireless parameter setting. The display unit 304 displays the generated QR code on the LCD or the like. The information necessary for performing wireless parameter setting includes, for example, identification information of an apparatus, a wireless parameter itself, and identification information of a wireless parameter automatic setting process.

Next, an operation performed by the communication system having the above-described configuration will be described. Here, the description will be given of a case of setting a wireless parameter of a network formed by an access point, for performing communication between the smartphone 101 and the camera 102. In this process, the smartphone 101 selects a wireless parameter to be provided to the camera 102 and a way of providing the selected wireless parameter, according to the state of the smartphone 101.

Figure 5A:
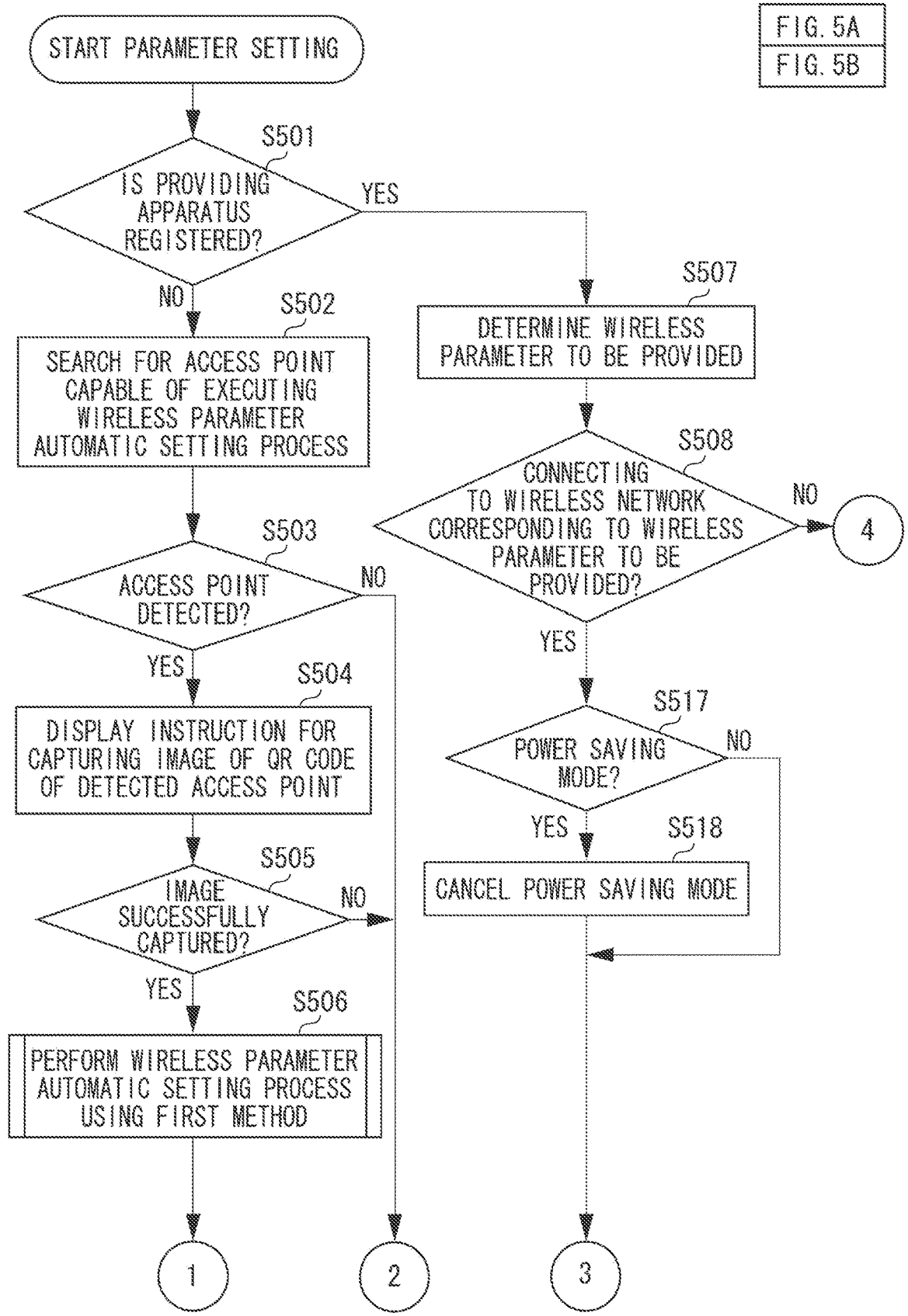
FIG. 5, which is composed of FIGS. 5A and 5B, a flowchart illustrating an operation of the smartphone.
Figure 5B:
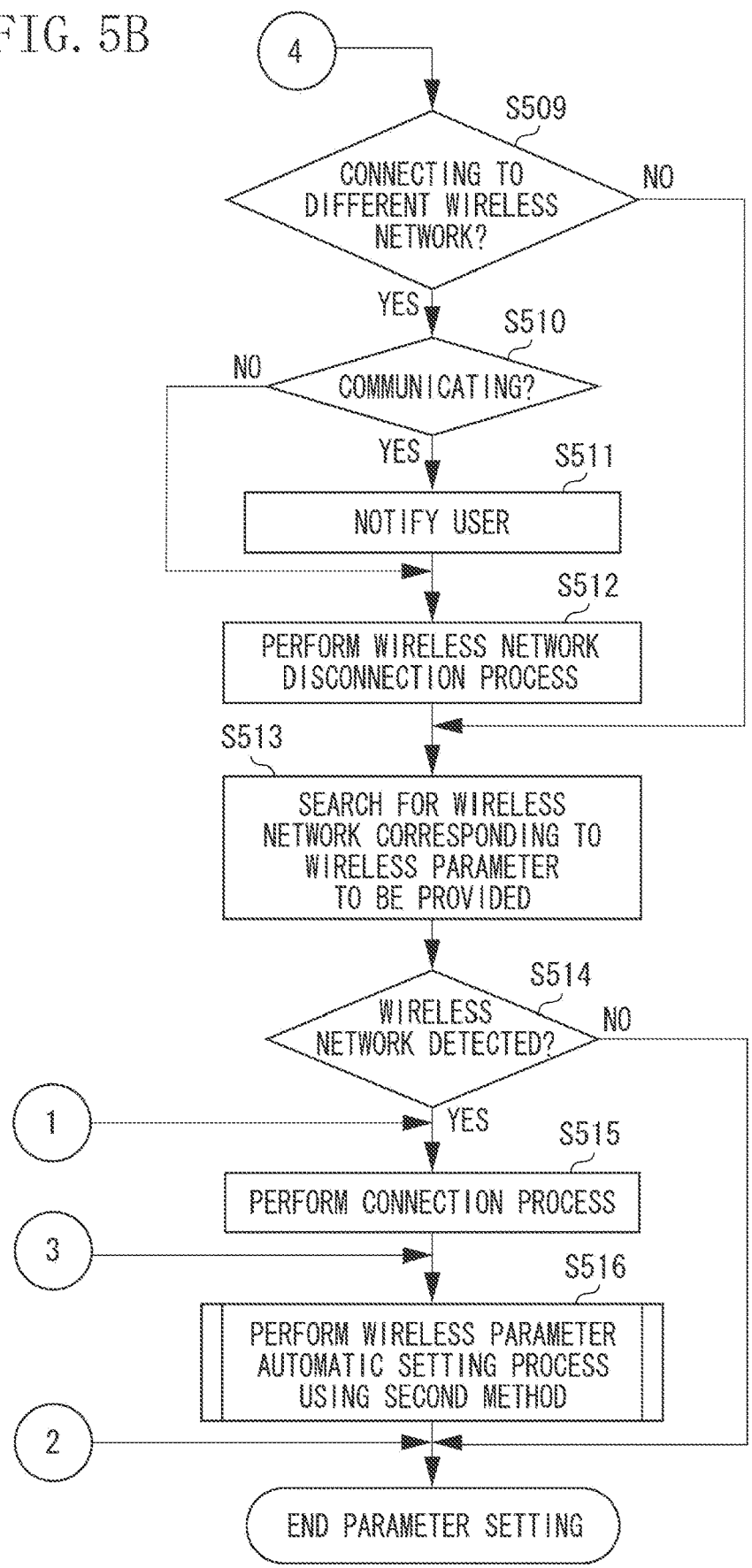

FIG. 5 is a flowchart illustrating a wireless parameter automatic setting process performed by the smartphone 101. The flowchart in FIG. 5 begins when the imaging unit 201 captures an image of a QR code after a user provides an instruction for starting wireless parameter automatic setting, via the operation unit 203. When information necessary for setting a wireless parameter is not included in the QR code in the captured image, the smartphone 101 may end with an error.

The flowchart in FIG. 5 illustrates a flow of processing to be performed when the control unit 206 reads and executes a computer program stored in the storage unit 207. Part or all of steps in the flowchart illustrated in FIG. 5 may be implemented by hardware such as an application specific integrated circuit (ASIC), for example.

In FIG. 5, after the imaging unit 201 captures the image of the QR code, the smartphone 101 decodes the QR code in the captured image. When the content of the QR code in the captured image is information necessary for setting a wireless parameter, in step S501, the smartphone 101 determines whether an apparatus operable as a providing apparatus for providing a wireless parameter is registered. As described above, the smartphone 101 can register a partner apparatus with which a wireless parameter automatic setting process has been performed through the setting using the first method. When there is a wireless network being connected, the smartphone 101 may register an access point of the network as an apparatus operable as providing apparatus for providing a wireless parameter. When the smartphone 101 determines that an apparatus operable as a providing apparatus for providing a wireless parameter is registered (YES in step S501), the processing proceeds to step S507. On the other hand, when the smartphone 101 determines that no apparatus is registered as an apparatus operable as a providing apparatus for providing a wireless parameter (NO in step S501), the processing proceeds to step S502. In step S501, whether the smartphone 101 holds a wireless parameter to be used for connection to another apparatus may be determined.

In step S507, the smartphone 101 performs a process for determining a wire less parameter to be provided to a receiving apparatus in the wireless parameter automatic setting process. Specifically, when only one apparatus operable as a providing apparatus for providing a wireless parameter is registered in the smartphone 101, in step S507, the smartphone 101 determines a wireless parameter for connecting to a wireless network formed by this registered apparatus, as the wireless parameter to be provided. When two or more apparatuses each being operable as a providing apparatus for providing a wireless parameter are registered, in the process in step S507, the smartphone 101 selects any apparatus of these registered apparatuses. The smartphone 101 then determines to provide a wireless parameter for connecting to a wireless network formed by the apparatus selected from among the registered apparatuses.

For example, when two or more apparatuses are registered, the smartphone 101 may select an apparatus to which the camera 102 is to be connected, according to an operation performed on the operation unit 203 by the user. In this case, the smartphone 101 may cause the display unit 204 to display identification information of each of the registered apparatuses, thereby allowing the user to select an apparatus to which the camera 102 is to be connected.

Further, when two or more apparatuses are registered, the smartphone 101 may set priorities to the respective apparatuses, and automatically select the apparatus having the highest priority. Furthermore, the smartphone 101 may select an access point of a currently connected network.

When the wireless parameter to be provided is determined, the processing proceeds to step S508. In step S508, the smartphone 101 determines whether the smartphone 101 is connecting, via the communication unit 209, to a wireless network with which communication can be performed using the wireless parameter to be provided. In the determination in step S508, it may be determined whether the smartphone 101 is connecting, via the communication unit 209, to the second apparatus selected in step S507. When it is determined in step S508 that the smartphone 101 is connecting (YES in step S508), the processing proceeds to step S517. When it is determined in step S508 that the smartphone 101 is not connecting (NO in step S508), the processing proceeds to step S509.

When it is determined in step S508 that the smartphone 101 is connecting (YES in step S508), the processing proceeds to step S517. In step S517, the smartphone 101 determines whether the smartphone 101 is connected to the network in a power saving mode defined in the IEEE 802.11 standard. When it is determined in step S517 that the smartphone 101 is not in the power saving mode (NO in step S517), the processing proceeds to step S516. When it is determined in step S517 that the smartphone 101 is in the power saving mode (YES in step S517), the processing proceeds to step S518. In step S518, the smartphone 101 cancels the power saving mode, and the processing proceeds to step S516.

In step S516, the smartphone 101 performs the wireless parameter automatic setting process using the second method described above. In other words, the smartphone 101 acquires the identification information of the first apparatus that is included in the read QR code. The smartphone 101 transfers, via the secure link, the identification information of the first apparatus that is included in the read QR code, to the selected second apparatus.

In this way, the wireless parameter is shared between the first apparatus and the second apparatus, so that the first apparatus can be connected to the wireless network formed by the second apparatus. The smartphone 101 is also connected to the wireless network formed by the second apparatus, and therefore, the smartphone 101 and the first apparatus can communicate with each other via the second apparatus.

On the other hand, when it is determined in step S508 that the smartphone 101 is not connecting, via the communication unit 209, to a wireless network with which communication can be performed using the wireless parameter to be provided (NO in step S508), the smartphone 101 operates as follows. Alternatively, this parameter setting processing may end when it is determined in step S508 that the smartphone 101 is not connecting to the wireless network.

In step S509, the smartphone 101 determines whether the smartphone 101 is connecting, via the communication unit 209, to a wireless network different from the wireless network corresponding to the wireless parameter to be provided. When it is determined that the smartphone 101 is connecting to a different wireless network (YES in step S509), the processing proceeds to step S510. When it is determined that the smartphone 101 is not connecting to a different wireless network (NO in step S509), the processing proceeds to step S513.

In step S510, the smartphone 101 determines whether the smartphone 101 is communicating in the different wireless network. When it is determined in step S510 that the smartphone 101 is communicating (YES in step S510), the processing proceeds to step S511. When it is determined in step S510 that the smartphone 101 is not communicating (NO in step S510), the processing proceeds to step S512. In step S511, the smartphone 101 displays, on the display unit 204, information indicating that the smartphone 101 is to be disconnected from the wireless network with which the smartphone 101 is communicating, to the user. The user may be prompted to choose whether to disconnect from the wireless network with which the smartphone 101 is communicating. When the user chooses not to disconnect from the wireless network with which the smartphone 101 is communicating, the wireless parameter setting processing ends with an error. Alternatively, the processing may continue after the completion of the communication. Whether to perform the process in step S511 is switched according to whether the smartphone 101 is communicating in step S510.

However, the determination in step S510 may be omitted, and the process in step S511 may be performed regardless of whether the smartphone 101 is communicating.

In step S512, the smartphone 101 performs a process for disconnecting from the wireless network to which the smartphone 101 is connecting. Upon the disconnection from the wireless network to which the smartphone 101 is connecting, the processing proceeds to step S513. In step S513, via the communication unit 209, the smartphone 101 searches for a wireless network corresponding to the wireless parameter to be provided that is determined in step S507. This search process may be achieved by an active scan performed based on transmission of a probe request and reception of a probe response defined in the IEEE 802.11 standard. Alternatively, this search process may be achieved by a passive scan performed based on reception of a beacon defined in the IEEE 802.11 standard.

In step S514, the smartphone 101 determines whether the wireless network being searched for is detected in the search process performed in step S513. When no wireless network is detected (NO in step S514), the smartphone 101 displays an error on the display unit 204, and the processing ends with the error.

When the wireless network is detected (YES in step S514), the processing proceeds to step S515. In step S515, the smartphone 101 performs a connection process to establish connection to the detected wireless network.

In this case, the smartphone 101 connects to the detected wireless network using the wireless parameter acquired using the first method. Upon completion of the connection process, the smartphone 101 performs the process in step S516 with an access point of the wireless network detected in step S514 serving as the second apparatus. The processing may end with an error when the connection process fails.

Next, the case where no apparatus is registered as an apparatus operable as a providing apparatus for providing a wireless parameter (NO in step S501) will be described. In this case, in step S502, the smartphone 101 searches for an access point capable of executing a wireless parameter automatic setting process. In the process in step S502, the smartphone 101 adds an information element concerning a wireless parameter automatic setting process to a probe request defined in the IEEE 802.11 standard, and transmits the probe request. When receiving a probe response to which an information element concerning a wireless parameter automatic setting process is added, the smartphone 101 detects a transmission source of this probe response as an access point capable of executing a wireless parameter automatic setting process. When it is determined that no apparatus is registered as an apparatus operable as a providing apparatus for providing a wireless parameter (NO in step S501), the processing may end with an error.

In step S503, the smartphone 101 determines whether an access point capable of executing a wireless parameter automatic setting process is detected in step S502. When it is determined that no access point is detected as an access point capable of executing a wireless parameter automatic setting process (NO in step S503), the smartphone 101 displays an error, and the processing ends. When it is determined that an access point is detected (YES in step S503), the processing proceeds to step S504. In step S504, the smartphone 101 provides display for instructing the user to capture an image of a QR code of the access point. This is to allow the access point and the smartphone 101 to perform the wireless parameter automatic setting process using the first method. Alternatively, besides the display provided in step S504, the smartphone 101 may shift to an image capturing mode in which the imaging unit 201 can perform image capturing.

Next, in step S505, the smartphone 101 determines whether an image of the QR code of the access point detected in step S502 is successfully captured. The determination in step S505 is performed based on whether an image of the QR code including identification information of the detected access point is successfully captured within a predetermined period from when the display is provided in step S504.

When it is determined in step S505 that an image of the QR code of the access point detected in step S502 is not successfully captured (NO in step S505), the smartphone 101 displays an error, and the processing ends. When it is determined in step S505 that an image of the QR code of the access point detected in step S502 is successfully captured (YES in step S505), the processing proceeds to step S506. In step S506, the smartphone 101 performs the wireless parameter automatic setting process using the first method described above. After the wireless parameter automatic setting process using the first method described above is performed, the processing proceeds to step S515. In step S515, the smartphone 101 performs a connection process using a wireless parameter acquired in this setting process. After the connection process is successfully performed, the processing proceeds to step S516. In step S516, the smartphone 101 performs the wireless parameter automatic setting process using the second method with the access point detected in step S502 serving as the second apparatus.

As described above, the wireless parameter automatic setting process using the first method is performed with the access point detected in step S502. However, a wireless parameter for connecting to an access point using WPS defined by the Wi-Fi Alliance may be acquired. When an access point is a group owner in Wi-Fi Direct (registered trademark), a wireless parameter for connecting to the access point (group owner) using Wi-Fi Direct (registered trademark) may be acquired.

According to the present exemplary embodiment described above, even if the smartphone 101 is not being connected to a wireless network when reading a QR code, an apparatus displaying the QR code can be connected to a wireless network formed by an access point.

Next, sequence chart of the communication system will be described using FIG. 4. The sequence chart illustrated in FIG. 4 will be described using a case where the smartphone 101 captures an image of a QR code of the camera 102, thereby connecting the camera 102 to the wireless network 104 formed by the AP 103. FIG. 4 will be described using case where the smartphone preregisters the AP 103 as an apparatus operable as a providing apparatus.

First, the smartphone 101 and the camera 102 each receive a parameter setting start instruction from the user. In step F401, the camera 102 displays a QR code on the display unit 304 upon receiving the parameter setting start instruction. In the displayed QR code, information necessary for performing a wireless parameter automatic setting process is encoded.

In step F402, the smartphone 101 activates the imaging unit 201 upon receiving the parameter setting start instruction. In step F403, the smartphone 101 captures an image of the QR code displayed by the camera 102.

After capturing the image, the smartphone 101 performs the processing illustrated in FIG. 5. Because the AP 103 is registered as the second apparatus, and the smartphone 101 is not being connected to the AP 103 at the time of capturing the image of die QR code, in step F404, the smartphone 101 performs a connection process to establish connection with the AP 103.

After the connection with the AP 103 is established, in step F405, the smartphone 101 executes a setting process using the second method, and then transmits an identifier included in the QR code in the captured image, to the AP 103.

In step F406, the AP 103 transmits a wireless parameter to the camera 102 using the received identifier. The wireless parameter transmitted in step F406 may be encrypted by a public key crypto system using a public key. For this case, for example, the method discussed in Japanese Patent Application Laid-Open No. 2013-17237 may be used. The public key may be acquired by, for example, capturing the image of the QR code.

In step F407, the camera 102 connects to the wireless network 104 using the received wireless parameter. When the connection between the camera 102 and the wireless network 104 is established in step F407, the smartphone 101 and the camera 102 may perform a data transfer service on the wireless network 104 via the AP 103. The data transfer service is a service for transferring data such as image data from one apparatus to the other apparatus.

As described above, according to the present exemplary embodiment, when connecting the camera 102 to the AP 103, the smartphone 101 can securely connect the camera 102 to the AP 103 even if the smartphone 101 itself is not being connected to the AP 103 at the time of image capturing.

In the first exemplary embodiment, the description has been given of the case where the AP 103 supports the wireless parameter automatic setting process using the second method, when the smartphone 101 connects the camera 102 to the AP 103. In a second exemplary embodiment, the description will be given of a case where the AP 103 does not support the wireless parameter automatic setting process. A configuration of each apparatus in the present exemplary embodiment is similar to the configuration in the first exemplary embodiment. An operation different from the operation in the first exemplary embodiment will be described.

The process performed in step S516 in the present exemplary embodiment will be described using a flowchart illustrated in FIG. 6. Upon start of the process, in step S601 in FIG. 6, the smartphone 101 determines whether the AP 103 to which the smartphone 101 is being connected supports a wireless parameter automatic setting process. The determination in step S601 is performed based on information received from an access point being connected. For example, when information indicating that the wireless parameter automatic setting process is executable is added to a signal such as a probe response received from an access point being connected, the smartphone 101 determines that this access point supports the wireless parameter automatic setting process. Alternatively, service information may be exchanged between the smartphone 101 and the access point being connected, and the determination may be performed based on the service information.

When the AP 103 is determined to support the wireless parameter automatic setting process (YES in step S601), the processing proceeds to step S605. In step S605, a process similar to the process in step S516 described in the first exemplary embodiment is performed. On the other hand, when the AP 103 is determined not to support the wireless parameter automatic setting process (NO in step S601), the processing proceeds to step S602. In step S602, the smartphone 101 starts an access point mode in which the smartphone 101 itself operates as an access point, and constructs a new wireless network. Instead of operating in the access point mode, the smartphone 101 may operate as a group owner of Wi-Fi Direct (registered trademark). Upon starting the operation in the access point mode, the smartphone 101 transmits a connection request to an apparatus (the camera 102) indicated by the identification information acquired through image capturing of the QR code, thereby connecting to this apparatus. After the smartphone 101 connects to the camera 102, the processing proceeds to step S603. In step S603, the smartphone 101 executes a sharing process for sharing a wireless parameter of the AP 103 by WPS or Wi-Fi Direct (registered trademark). After the completion of the sharing process, the processing proceeds to step S604. In step S604, the smartphone 101 stops the operation in the access point mode, and ends the constructed wireless network. In this process, if the smartphone 101 is disconnected from the AP 103, the smartphone 101 establishes connection to the AP 103 again.

In this way, according to the present exemplary embodiment, the smartphone 101 can connect the camera 102 to the AP 103 upon image capturing of the QR code of the camera 102, even if the AP 103 to which the smartphone 101 is being connected does not support the wireless parameter automatic setting process.

The operation in the first exemplary embodiment and the operation in the second exemplary embodiment may be combined as appropriate.

In the above-described exemplary embodiments, the description has been given of the configuration in which the information for setting the wireless parameter is exchanged between the apparatuses using the image of the QR code. However, in place of the image capturing of the QR code, wireless communication such as NFC and Bluetooth (registered trademark) may be used. Alternatively, wireless communication such as IEEE 802.11ad and Transferjet (registered trademark) may be used.

In each of the exemplary embodiments, the QR code to be read may not be limited to the QR code displayed on the display unit. For example, the QR code to be read may be a QR code in a form such as a label affixed to a casing of a communication apparatus, or may be a QR code affixed to an instruction manual of a communication apparatus or a package such as a cardboard box containing a communication apparatus for sale. Further, in place of the QR code, a one-dimensional bar code or a two-dimensional code other than the QR code may be used. Furthermore, in place of machine-readable information such as the QR code, information in user-readable form may be adopted. In addition, the camera 102 may have a function of a web server to be capable of displaying a QR code on a web page.

In each of the exemplary embodiments, the description has been given of the case where the smartphone 101 and the AP 103 are connected by the wireless LAN communication. However, the smartphone 101 and the AP 103 may be connected by wired communication.

Further, in each of the exemplary embodiments, the description has been given of the case where the communication between the apparatuses is performed by the wireless LAN communication compliant with the IEEE 802.11, but this is not limitative. For example, the communication may be performed using a wireless communication medium such as wireless Universal Serial Bus (USB), the Multiband OFDM Alliance (MBOA), Bluetooth (registered trademark), Ultra wide Band (UNB), ZigBee, and NFC. UWB includes wireless USB, wireless 1394, WiMedia Network (WiNET), and the like.

Furthermore, in each of the exemplary embodiments, the description has been given of the case where the access point of the wireless LAN provides the wireless parameter, but this is not limitative. For example, a group owner of Wi-Fi Direct (registered trademark) may provide a wireless parameter.

In each of the exemplary embodiments, the smartphone 101 may determine whether the smartphone 101 is connecting, via the communication unit 209, to an access point when the imaging unit 201 captures an image of a QR code, and switch the processing according to a result of this determination. For example, when not being connected to an access point at the time of capturing an image of a QR code, the smartphone 101 may end the subsequent process as an error. Further, when not being connected to an access point at the time of capturing an image of a QR code, the smartphone 101 may display, on the display unit 204, notification for prompting the user to connect the smartphone 101 to an access point. For example, this display may be display for prompting the user to capture an image of a QR code of the access point to perform setting using the first method. The notification for promoting the user to connect the smartphone 101 to an access point may be information including a method of connecting the smartphone 101 to an access point, such as a message indicating "please connect to an access point by a wireless LAN". The notification for promoting the user to connect the smartphone 101 to an access point may be information instructing the user to establish connection using a method different from the wireless LAN, such as NFC.

If the smartphone 101 is connected to an access point in response to any of these types of display provided when the smartphone 101 is not being connected to the access point at the time of capturing an image of a QR code, information included in the QR code may be transferred to this access point, and setting using the second method may be thereby performed. In this way, an error may be displayed when the smartphone 101 is not connected to an access point at the time of capturing an image of a QR code. This allows the user to identify why the wireless parameter automatic setting process is not performed. In other words, even if the smartphone 101 is not connected to an access point at the time of capturing an image of a QR code, the user is prompted to establish connection to an access point. Therefore, situations where setting of a wireless parameter is not performed are reduced, which improves convenience.

When being connected to an access point at the time of capturing an image of a QR code, the smartphone 101 may have a positive result (YES) of the determination in step S501, and then in step S507, the smartphone 101 may select a wireless parameter for connecting to this access point, to perform the subsequent processes.

Aspects of the present invention can also be implemented by such processing that a program that implements one or more functions of the above-described exemplary embodiments is supplied to a system or apparatus via a network or storage medium, and one or more processors in a computer of the system or apparatus read and execute the program. The present invention can also be implemented by a circuit (e.g., an application-specific integrated circuit (ASIC)) that implements one or more functions.

According to the above-described exemplary embodiments, even if an own apparatus is not connected to another apparatus, which is operable as a providing apparatus, when an image including information necessary for setting a wireless parameter is captured, the other apparatus can be notified of the information.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-023712, filed Feb. 9, 2015, which is hereby incorporated by reference herein in its entirety.

What is claimed is:

1. The communication method comprising:
   capturing an image by an image capturing unit;
   analyzing the captured image by an acquisition unit and acquiring identification information of a first communication apparatus different from the communication apparatus, wherein the first communication apparatus supports a predetermined setting process for sharing a wireless parameter;
   determining by a determination unit whether the communication apparatus is connected to an access point which supports the predetermined setting process, wherein the access point is different from the communication apparatus and the first communication apparatus;
   notifying by a notification unit, in a case where the communication apparatus is connected to the access point, notify the access point of the identification information acquired by the acquisition unit, in order to cause the first communication apparatus and the access point to perform the predetermined setting process; and
   providing by a providing unit, in a case where the communication apparatus is not connected to the access point, perform the predetermined setting process with the first communication apparatus and provide a wireless parameter for connecting to the access point to the first communication apparatus indicated by the identification information.

2. A non-transitory storage medium storing computer executable instructions for causing a communication apparatus to function as:

an image capturing unit configured to capture an image;

an acquisition unit configured to analyze the captured image and acquire identification information of a first communication apparatus different from the communication apparatus, wherein the first communication apparatus supports a predetermined setting process for sharing a wireless parameter;

a determination unit configured to determine whether the communication apparatus is connected to an access point which supports the predetermined setting process, wherein the access point is different from the communication apparatus and the first communication apparatus;

a notification unit configured to, in a case where the communication apparatus is connected to the access point, notify the access point of the identification information acquired by the acquisition unit, in order to cause the first communication apparatus and the access point to perform the predetermined setting process; and a providing unit configured to, in a case where the communication apparatus is not connected to the access point, perform the predetermined setting process with the first communication apparatus and provide a wireless parameter for connecting to the access point to the first communication apparatus indicated by the identification information.

3. A communication apparatus comprising:

an image capturing unit configured to capture an image;

an acquisition unit configured to analyze the captured image and acquire identification information of a first communication apparatus different from the communication apparatus, wherein the first communication apparatus supports a predetermined setting process for sharing a wireless parameter;

a determination unit configured to determine whether the communication apparatus is connected to an access point which supports the predetermined setting process, wherein the access point is different from the communication apparatus and the first communication apparatus;

a notification unit configured to, in a case where the communication apparatus is connected to the access point, notify the access point of the identification information acquired by the acquisition unit, in order to cause the first communication apparatus and the access point to perform the predetermined setting process; and a providing unit configured to, in a case where the communication apparatus is not connected to the access point, perform the predetermined setting process with the first communication apparatus and provide a wireless parameter for connecting to the access point to the first communication apparatus indicated by the identification information.

4. The communication apparatus according to claim 3, further comprising a display unit configured to display an error in a case where the identification information is not acquired by the acquisition unit.

5. The communication apparatus according to claim 3, wherein the image captured by the image capturing unit is a barcode, a two dimensional code or a QR code.

6. The communication apparatus according to claim 3, wherein the wireless parameter is information for performing communication compliant with IEEE 802.11 standard.

7. The communication apparatus according to claim 3, further comprising an activation unit configured to, in a case where the communication apparatus is not connected to the access point, activate the communication apparatus to operate as an access point, when the identification information is acquired by the acquisition unit, wherein the providing unit provides a wireless parameter to the first communication apparatus identified by the identification information, in a wireless network formed by the communication apparatus operating as the access point that is activated by the activation unit.

8. The communication apparatus according to claim 3, wherein the wireless parameter includes at least any one of an SSID, an encryption method, a key, or an encryption key, or an authentication method.

9. The communication apparatus according to claim 3, wherein the access point is compliant with IEEE 802.11 standard.

* * * * *